(12) United States Patent
McCaffrey et al.

(10) Patent No.: US 6,203,472 B1
(45) Date of Patent: Mar. 20, 2001

(54) WHEEL ATTACHMENT

(75) Inventors: Robert J. McCaffrey, Dracut; Harald Quintus-Bosz, Sudbury, both of MA (US)

(73) Assignee: Graber Products, Inc., Madison, WI (US)

( * ) Notice: Subject to any disclaimer, the term of this patent is extended or adjusted under 35 U.S.C. 154(b) by 0 days.

(21) Appl. No.: 08/890,585

(22) Filed: Jul. 9, 1997

(51) Int. Cl.[7] ................................................ A63B 69/16
(52) U.S. Cl. ............................ 482/61; 482/57; 482/63; 434/61
(58) Field of Search ................................ 482/57, 58, 59, 482/60, 61, 62, 63, 64, 65; 434/61

(56) References Cited

U.S. PATENT DOCUMENTS

| | | | |
|---|---|---|---|
| 4,817,939 | * | 4/1989 | Augspurger et al. .................. 272/73 |
| 4,976,424 | * | 12/1990 | Sargeant et al. ...................... 272/73 |

* cited by examiner

Primary Examiner—Mickey Yu
Assistant Examiner—Tam Nguyen
(74) Attorney, Agent, or Firm—Andrus, Sceales, Starke & Sawall, LLP

(57) ABSTRACT

An apparatus and method for removably holding an axle includes an axle attachment which is removably attachable to an end of the axle. A threaded shaft is coupled to the axle attachment, and a latch is selectively engageable with the threads of the shaft. A crank is coupled to the shaft, and rotation of the crank results in advancement of the axle attachment towed the end of the axle, to clamp the axle between the axle attachment and a centering apparatus engageable with the opposite end of the axle. The latch is movable to a release position in which the latch is disengaged from the threads of the shaft. A spring bears against the crank so as to bias the axle attachment away from the end of the axle, and the spring functions to disengage the axle attachment from the end of the axle when the latch is moved to its release position. The centering apparatus is movable to varying positions so as to accommodate varying axle lengths and to provide proper centering of the axle.

8 Claims, 22 Drawing Sheets

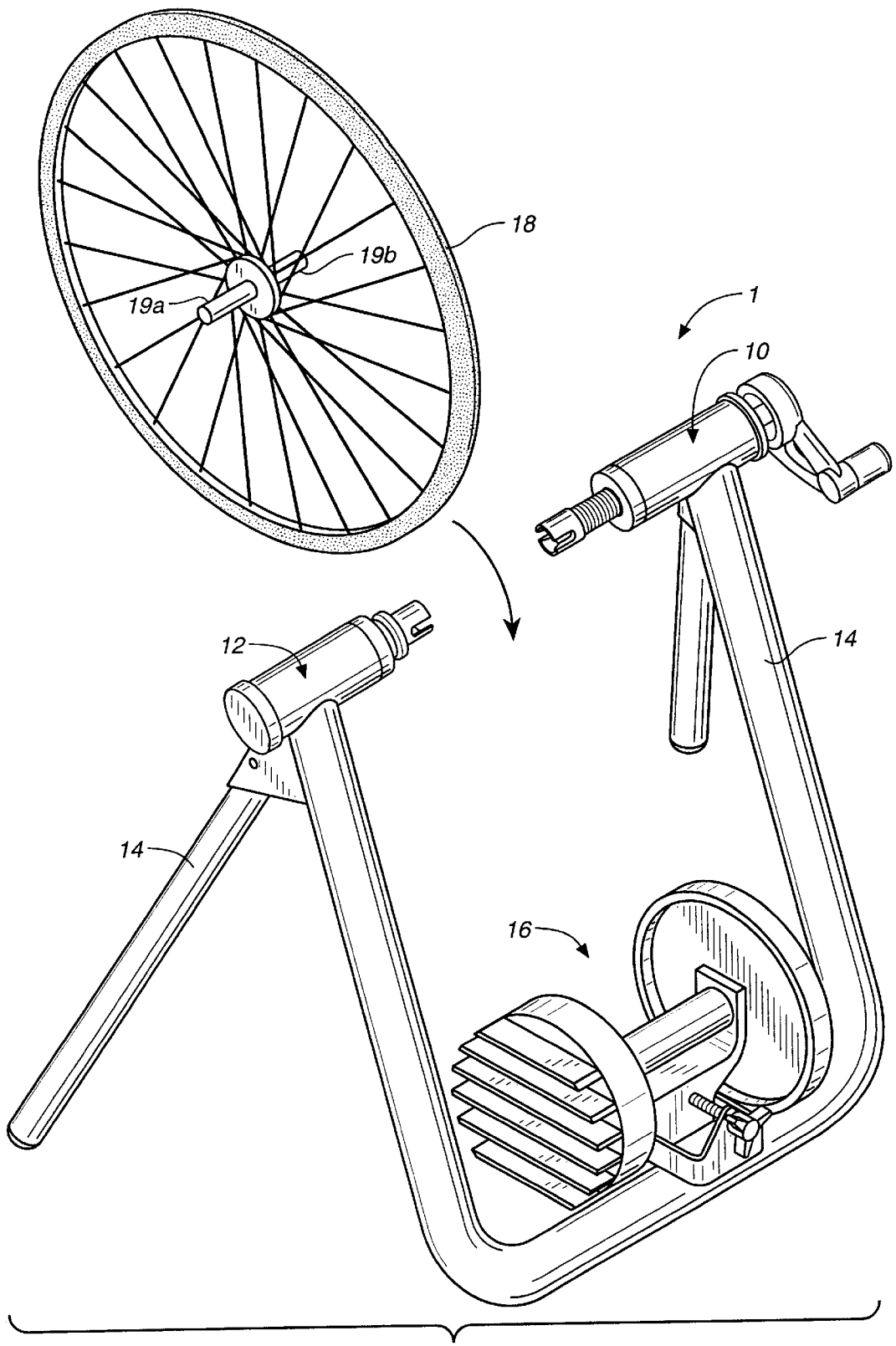
FIG._1

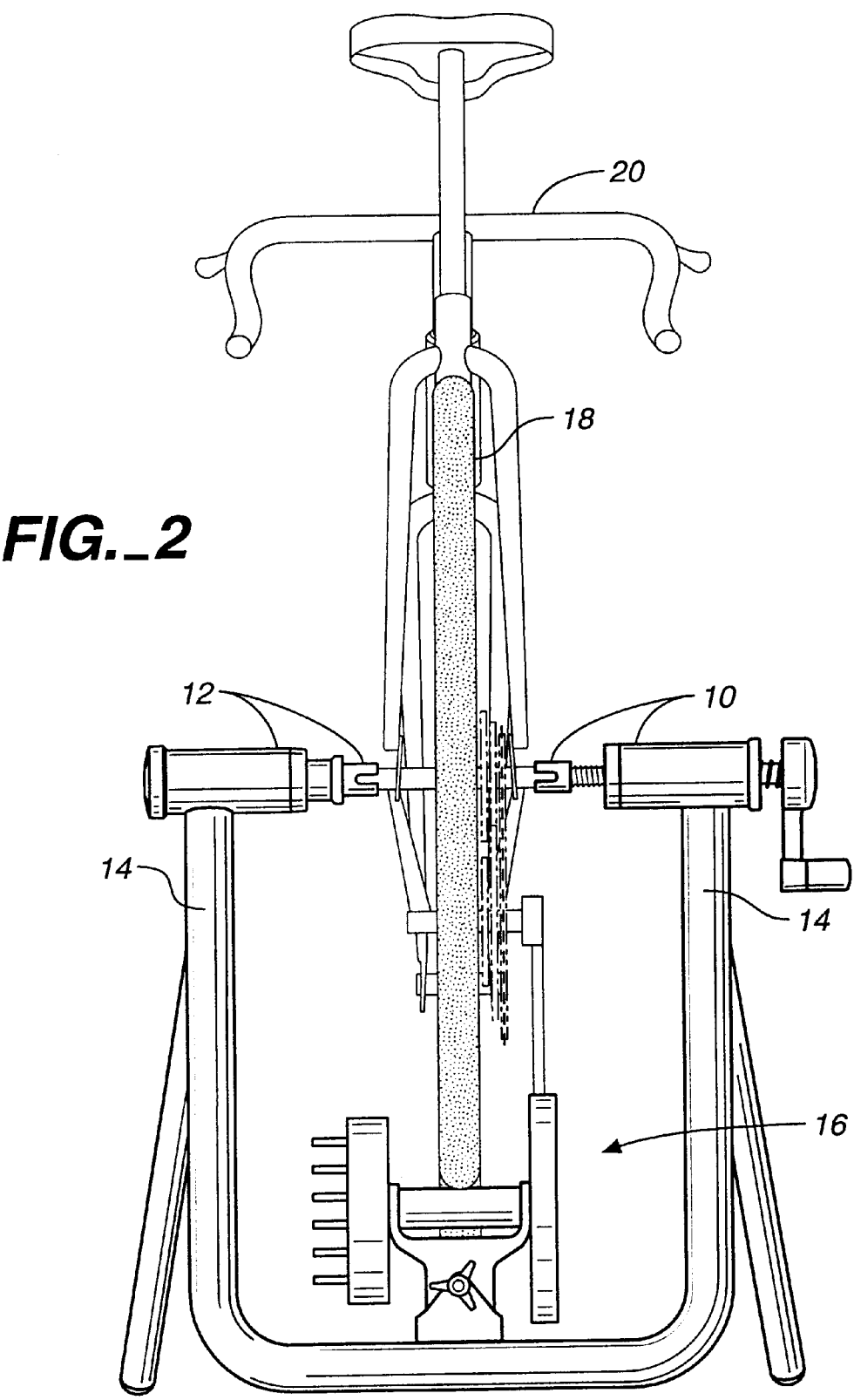
FIG._2

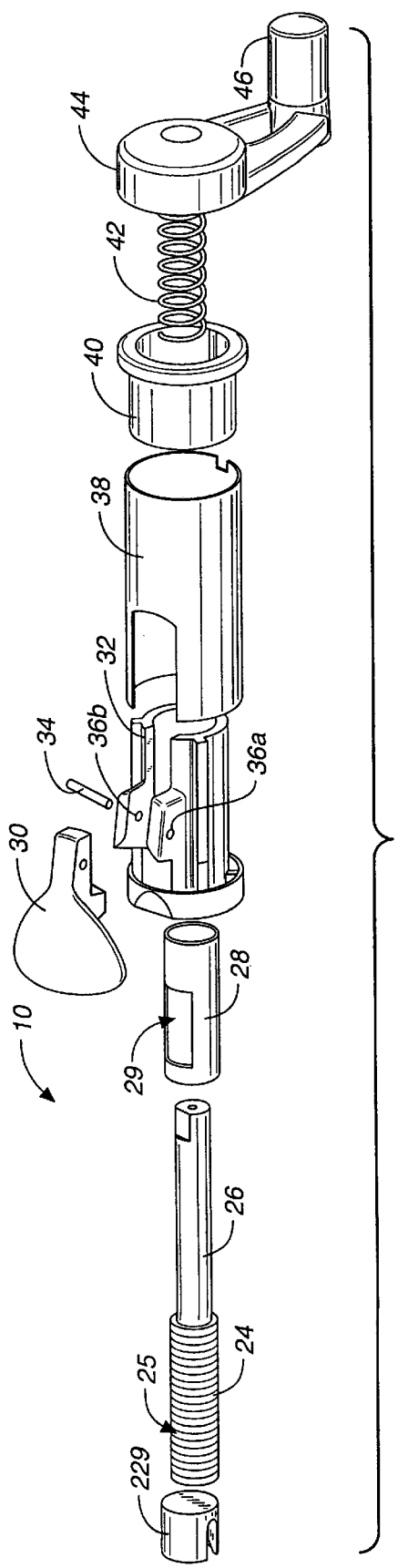
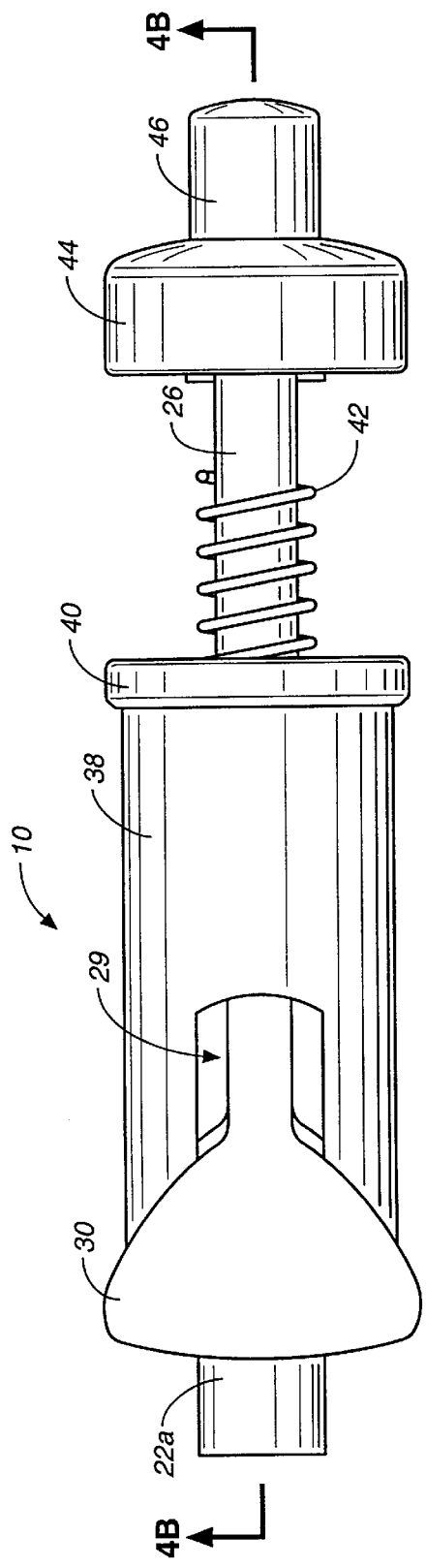
FIG._3
FIG._4A

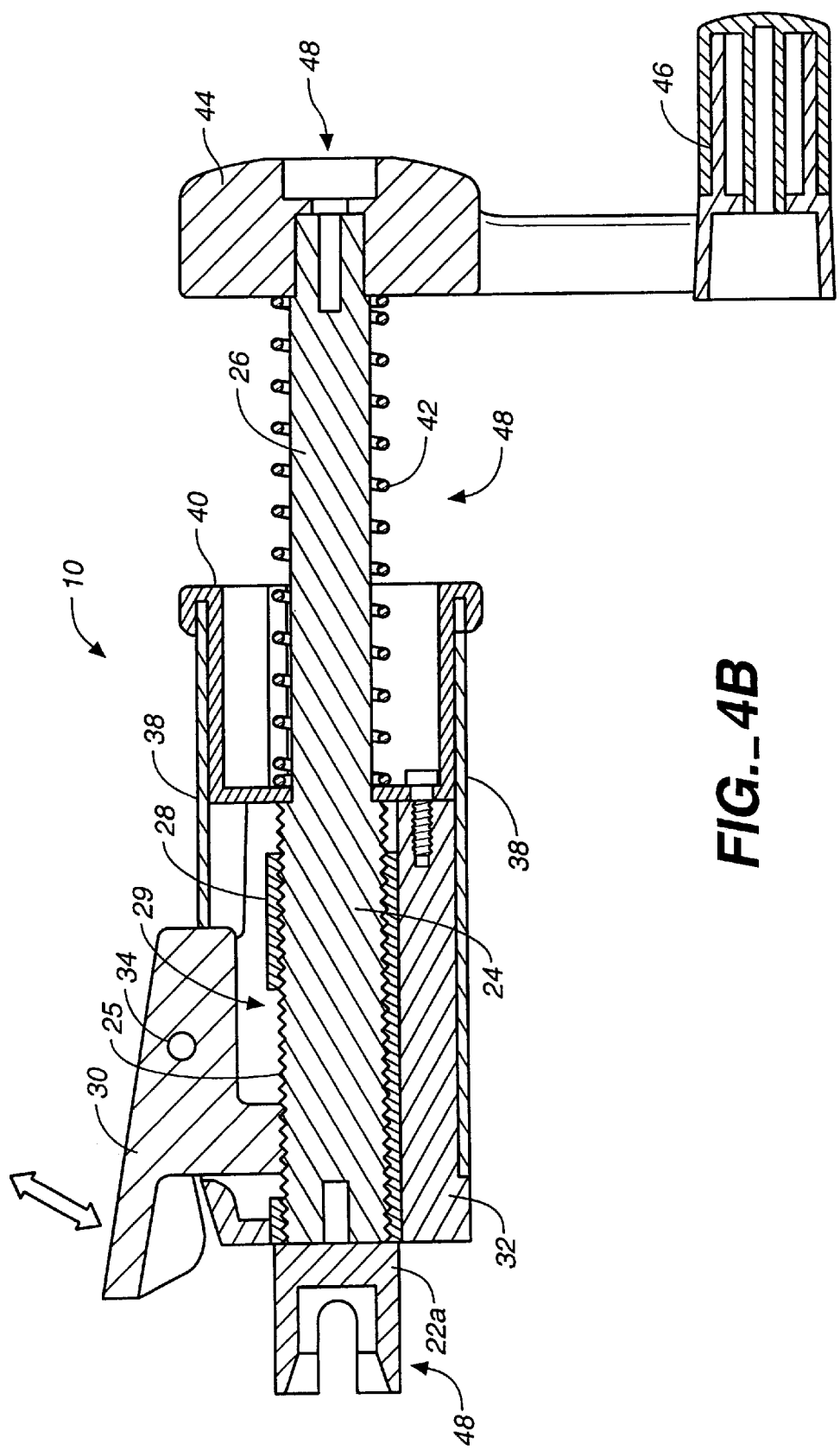
FIG._4B

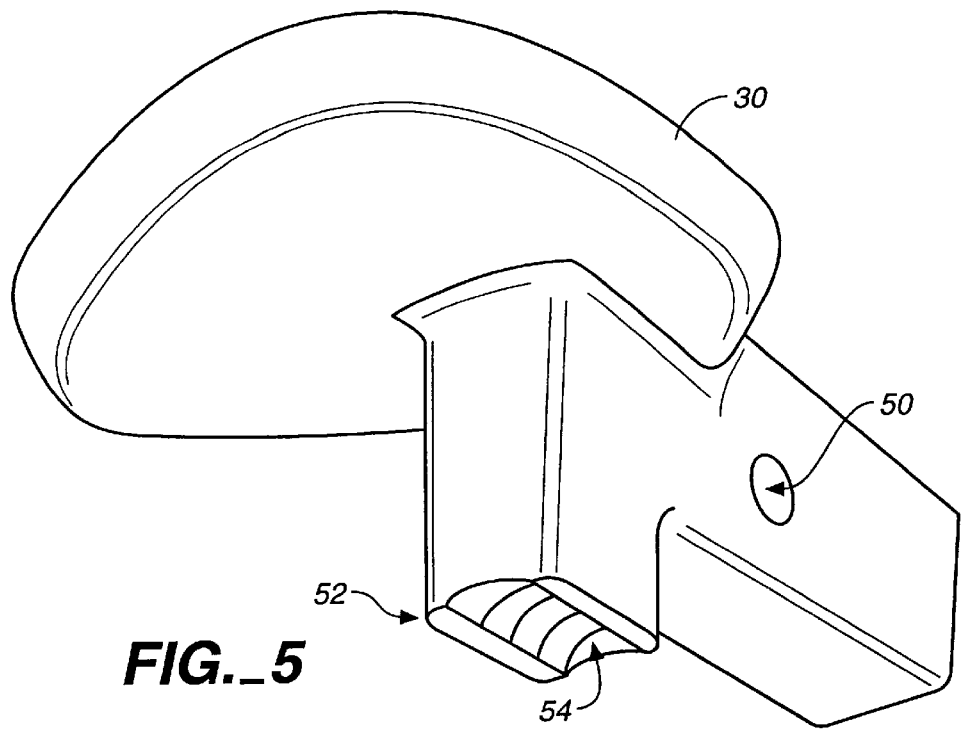
FIG._5
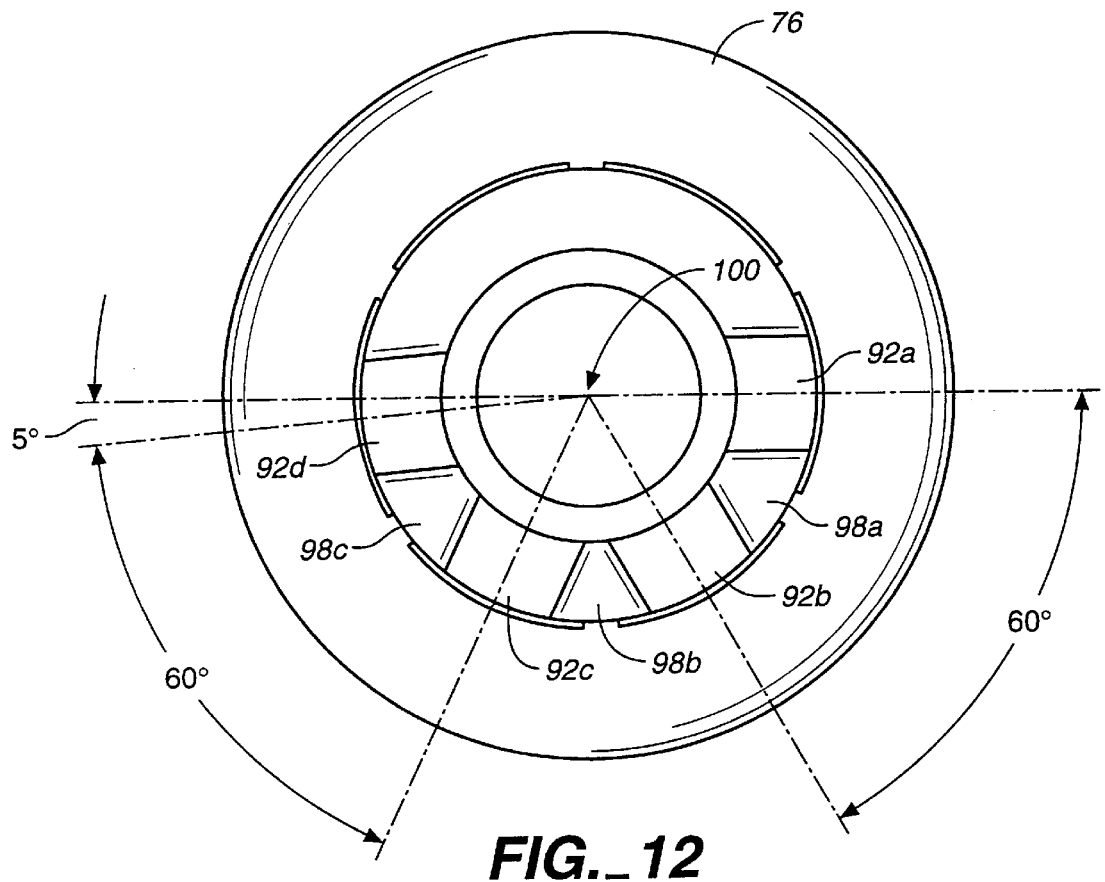
FIG._12

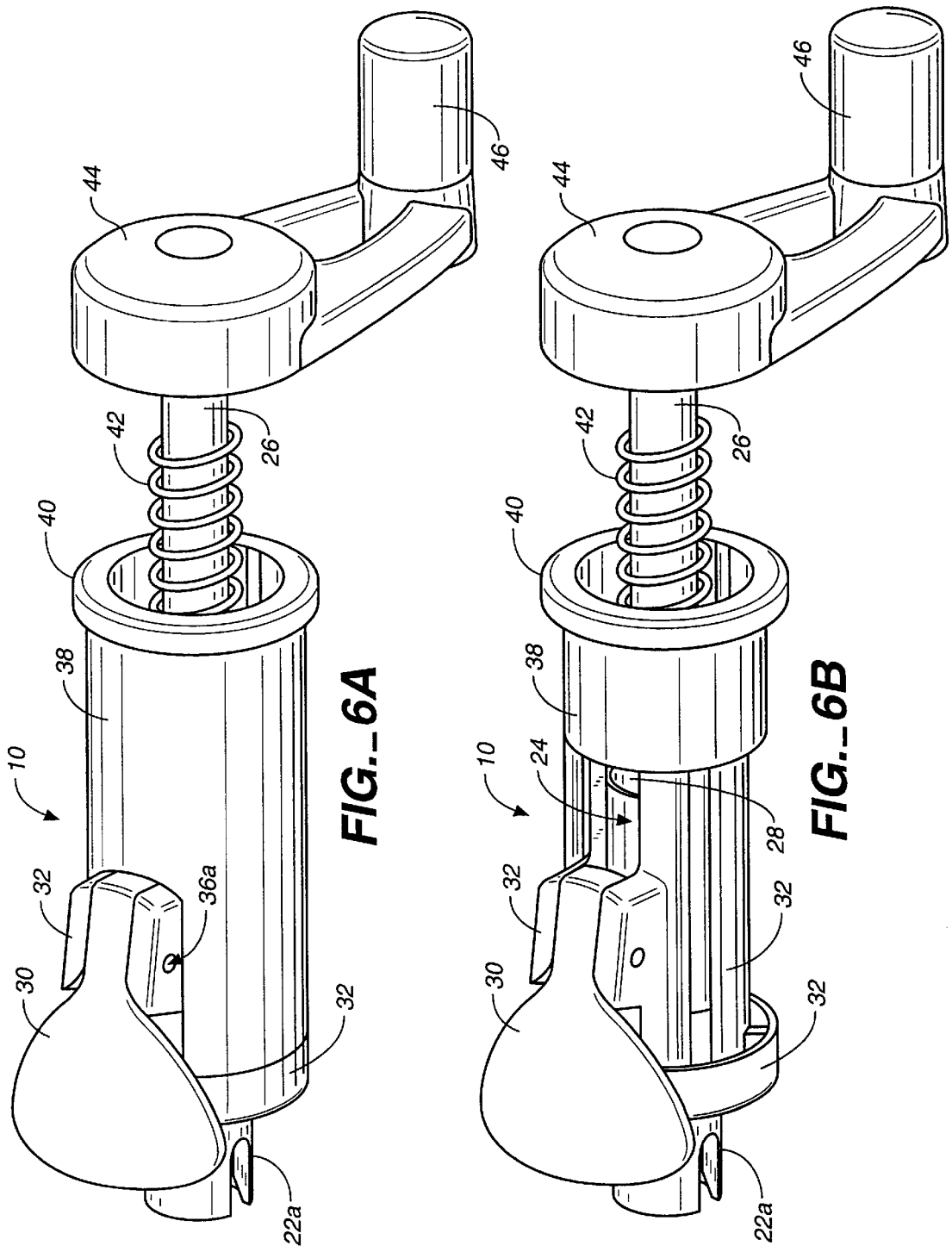

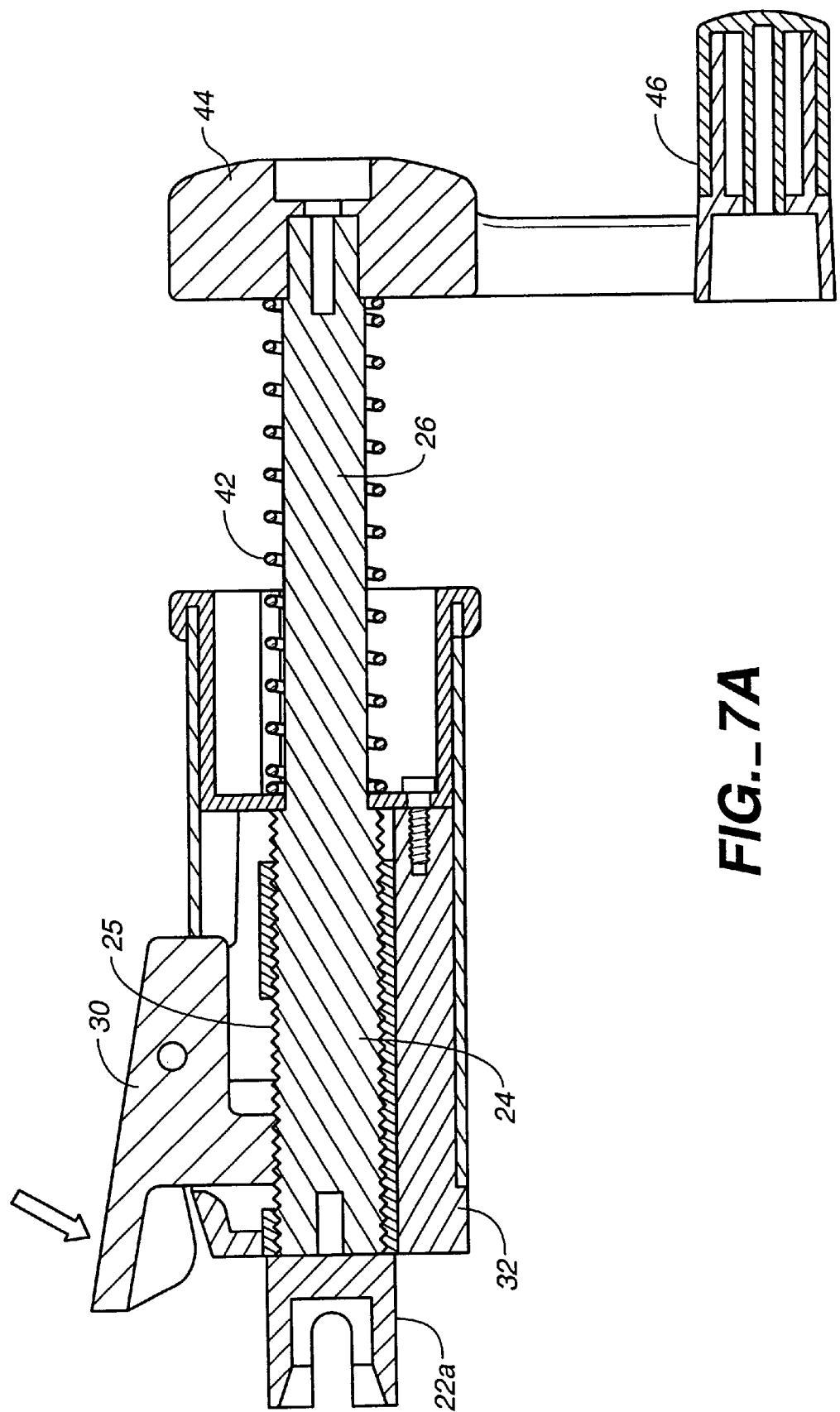
FIG._7A

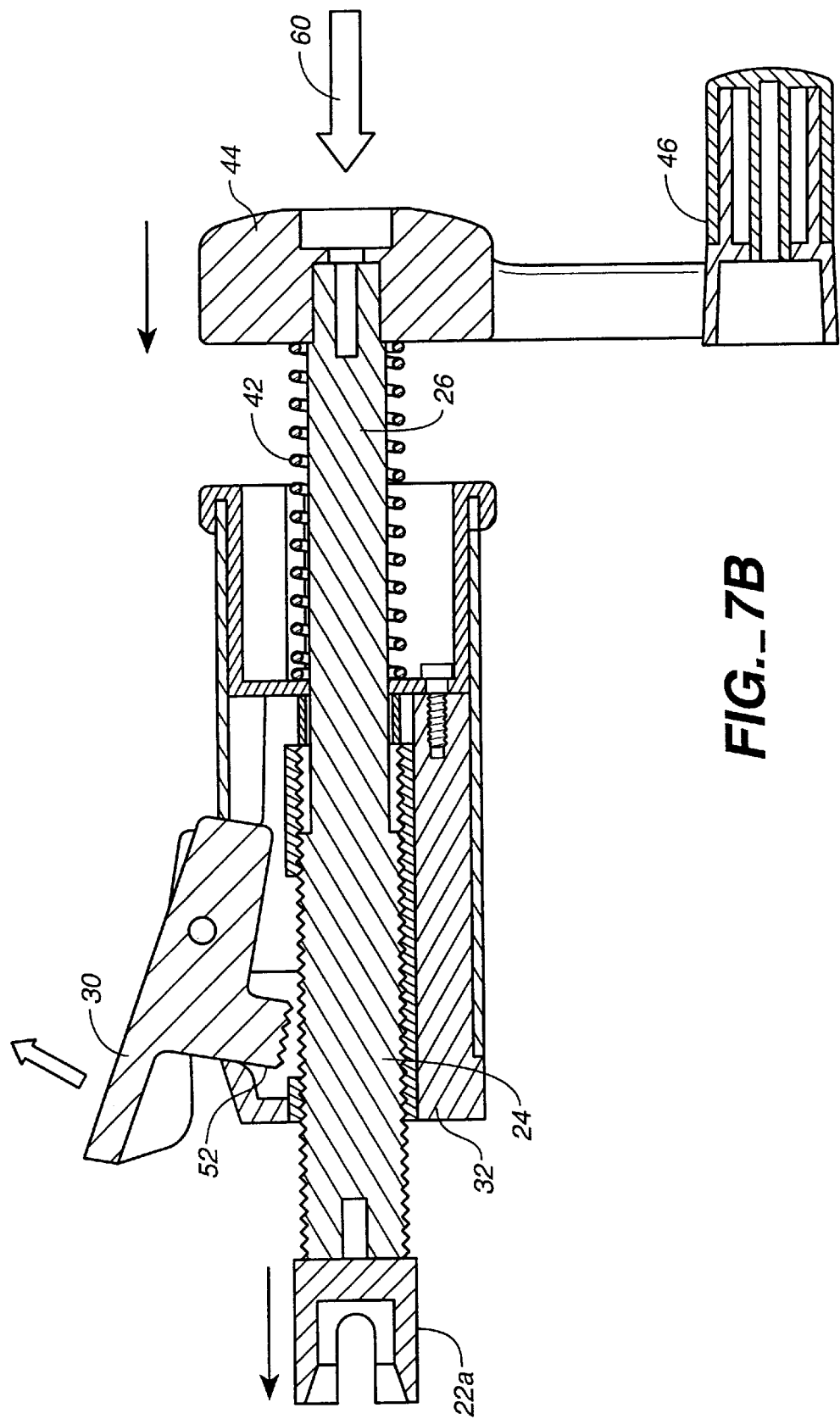
FIG._7B

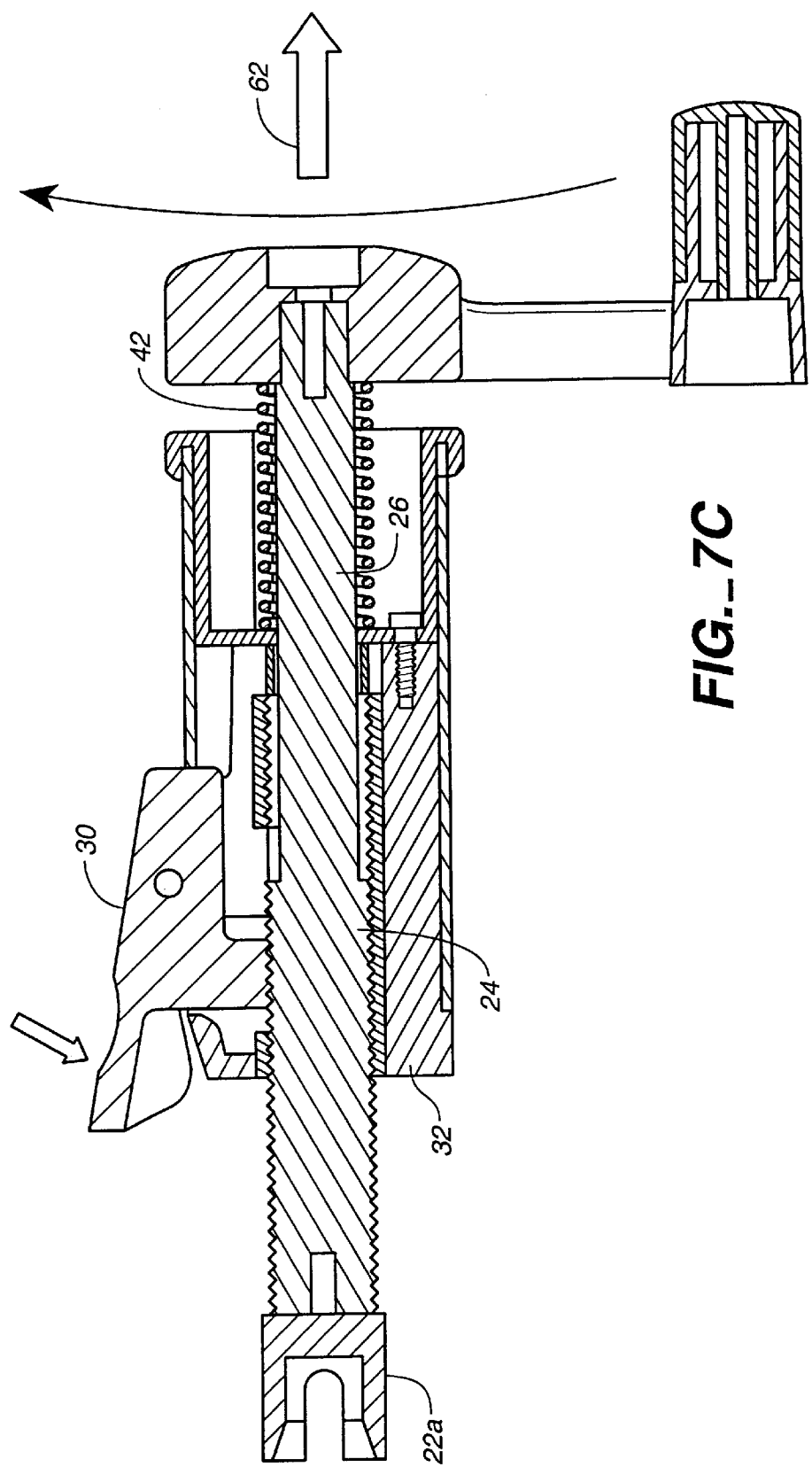
FIG._7C

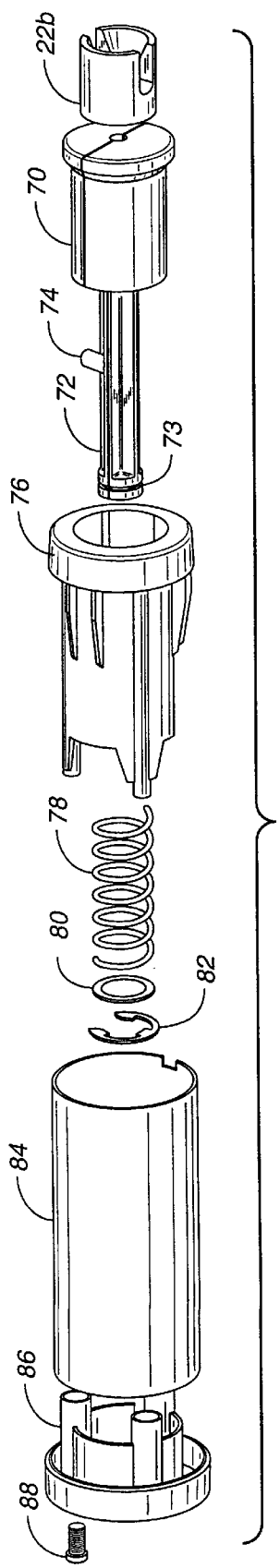
FIG._8
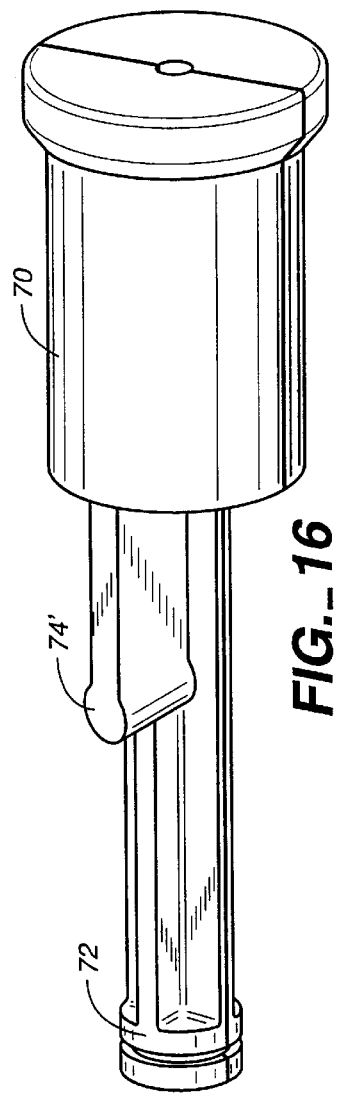
FIG._16

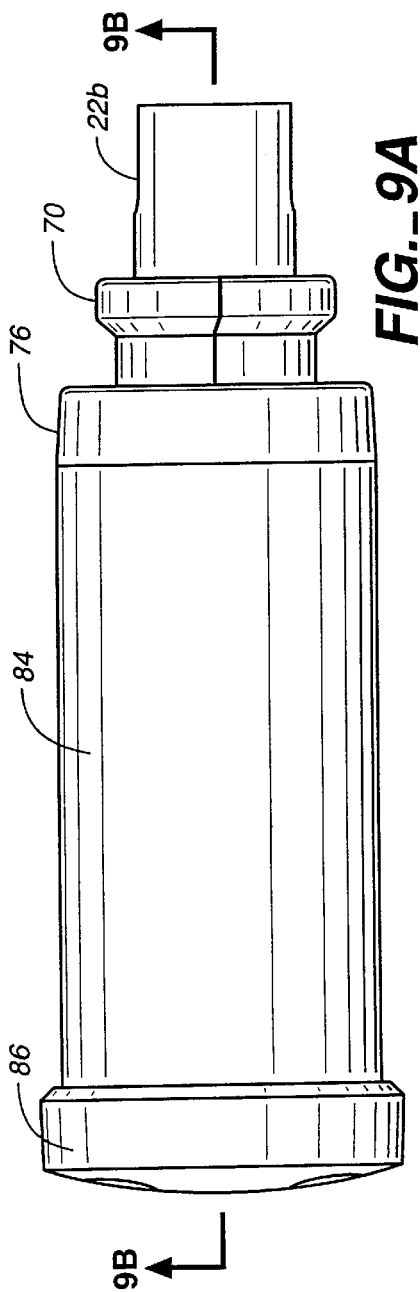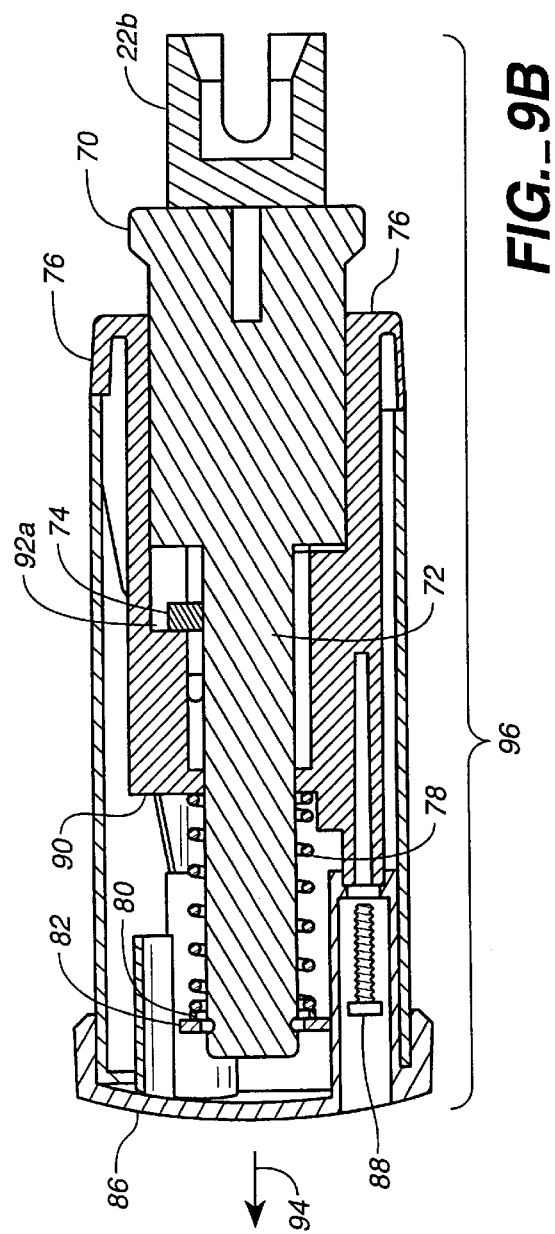

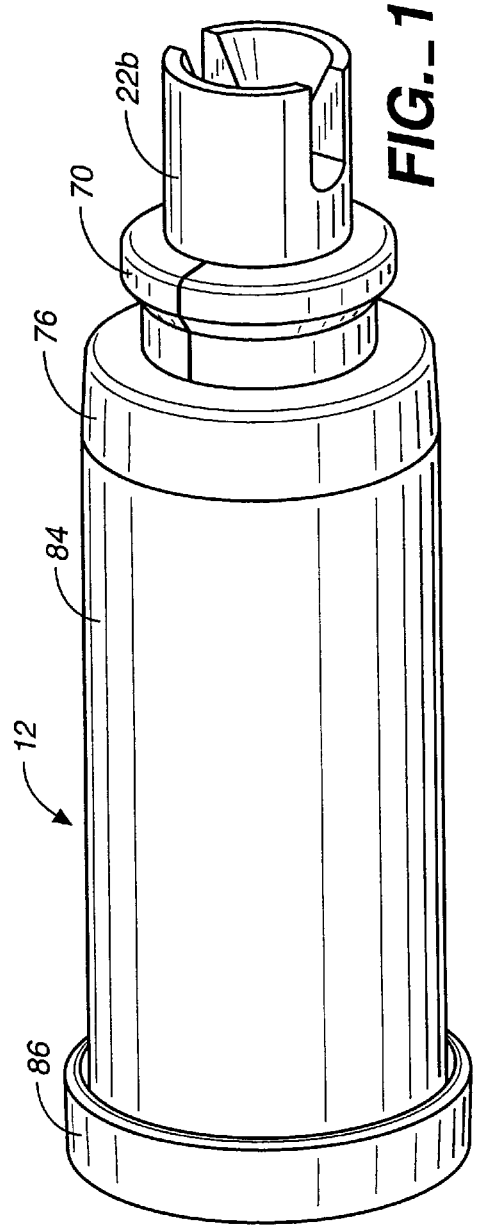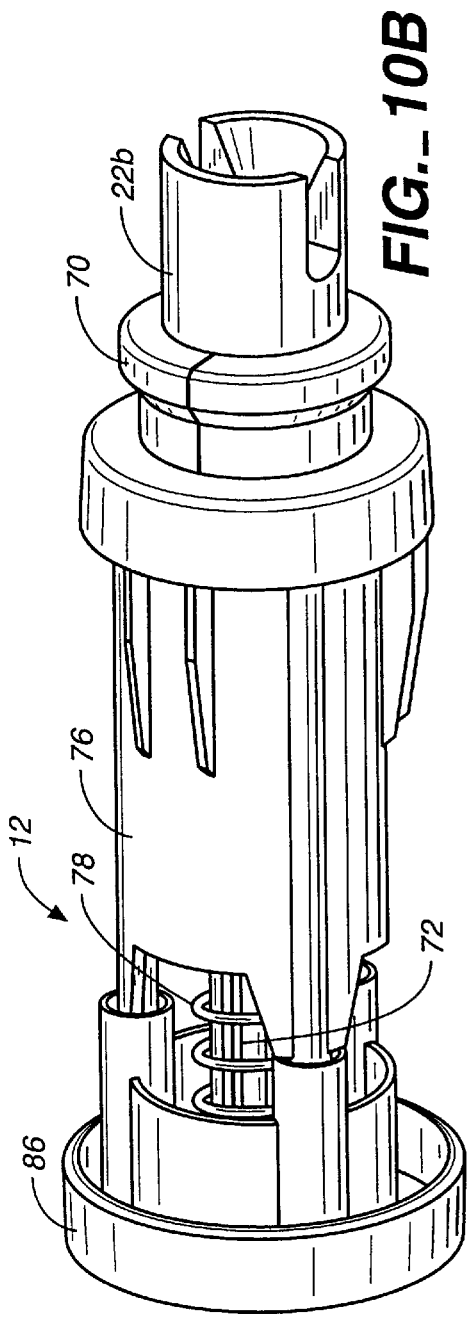

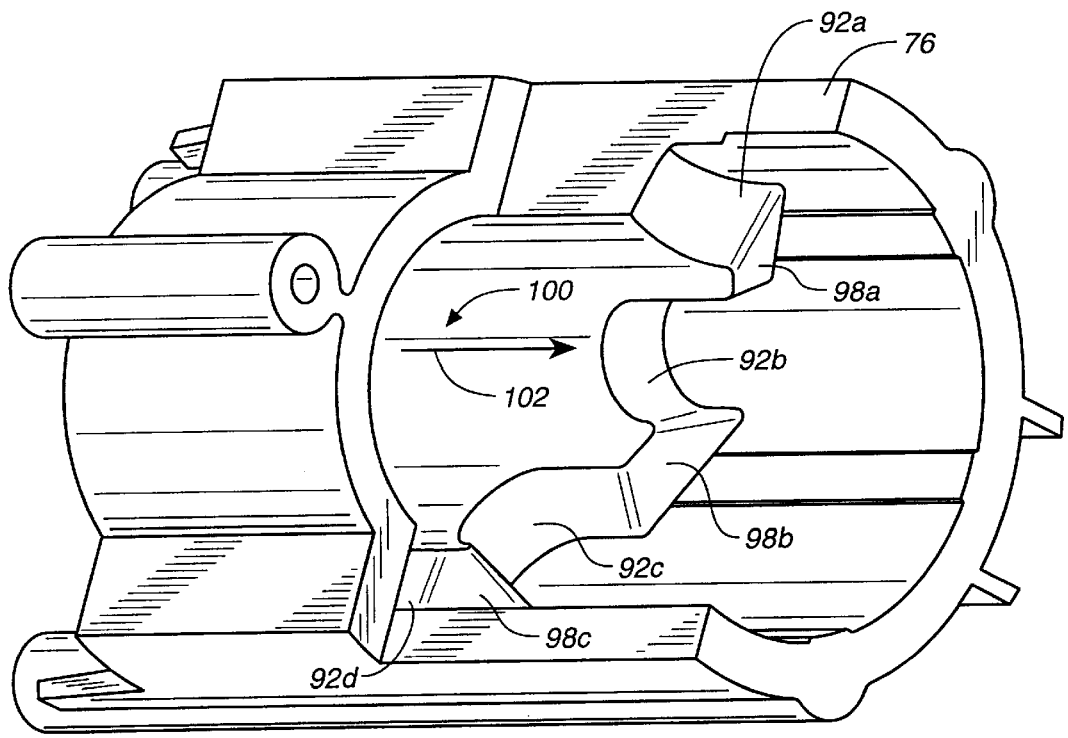
FIG._11A
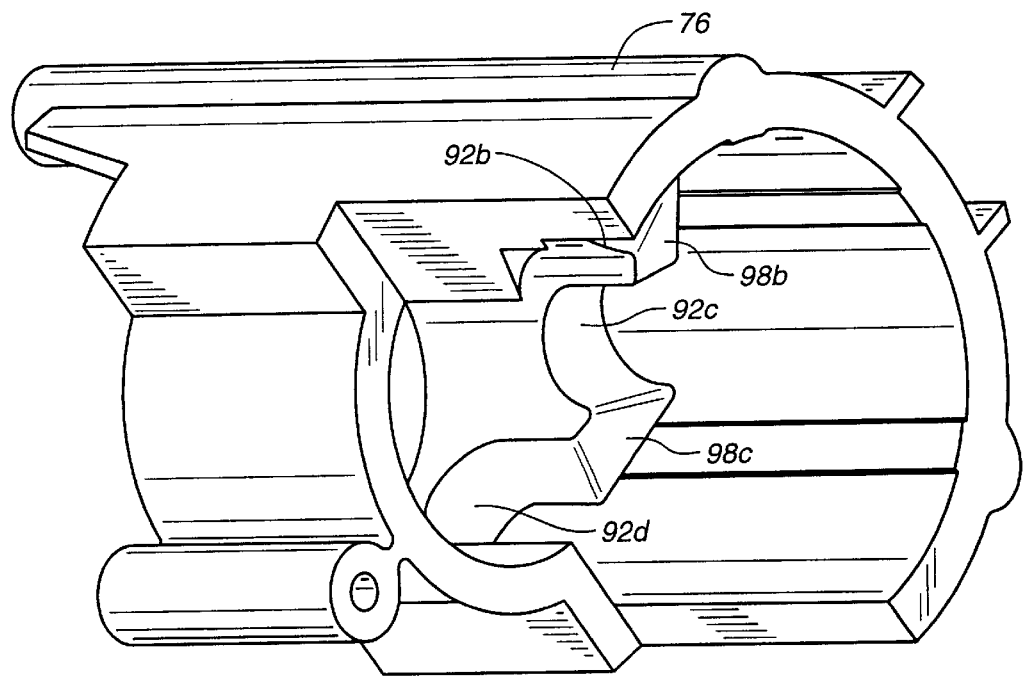
FIG._11B

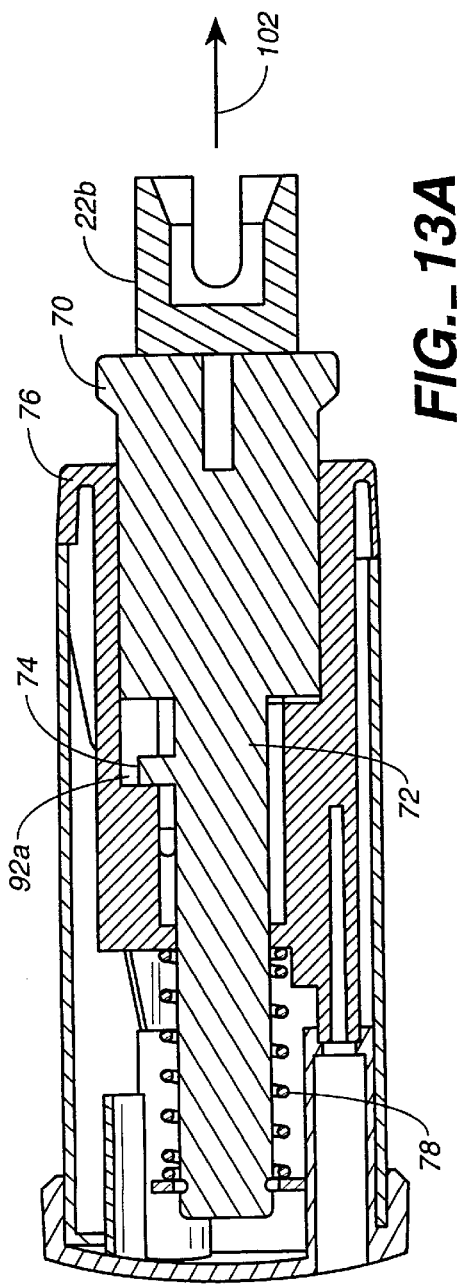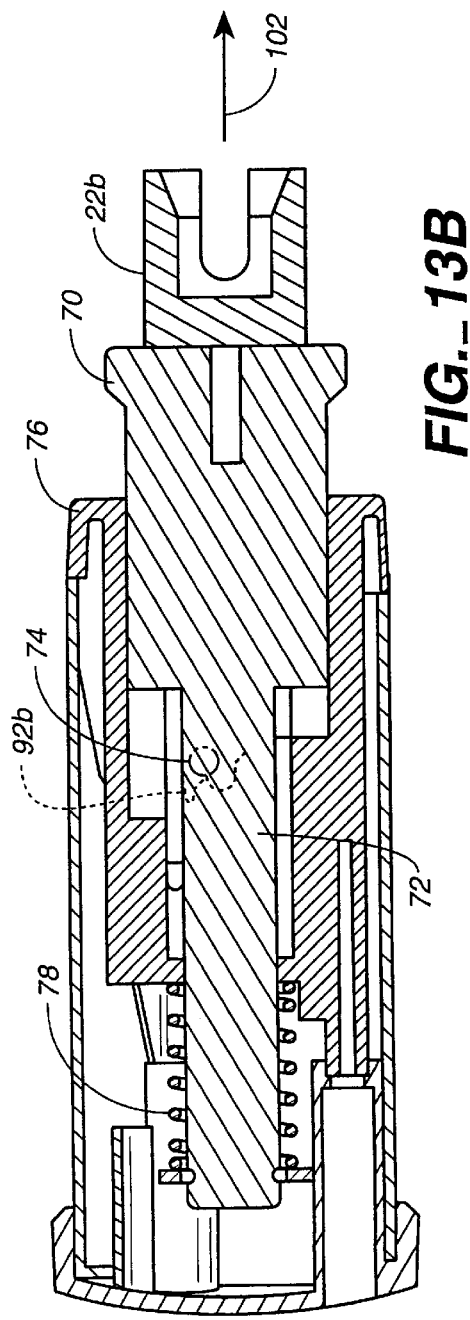

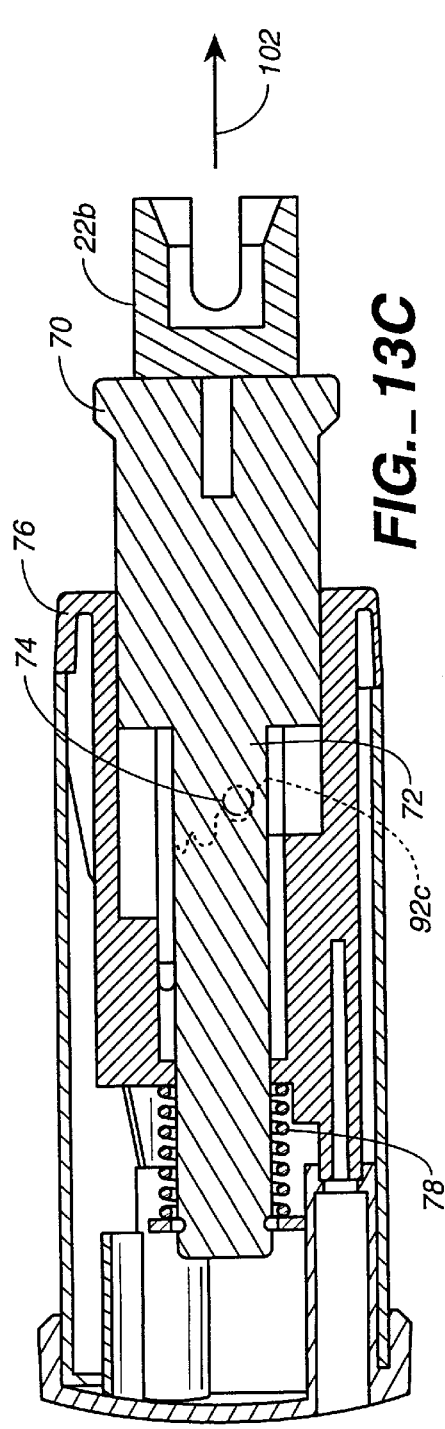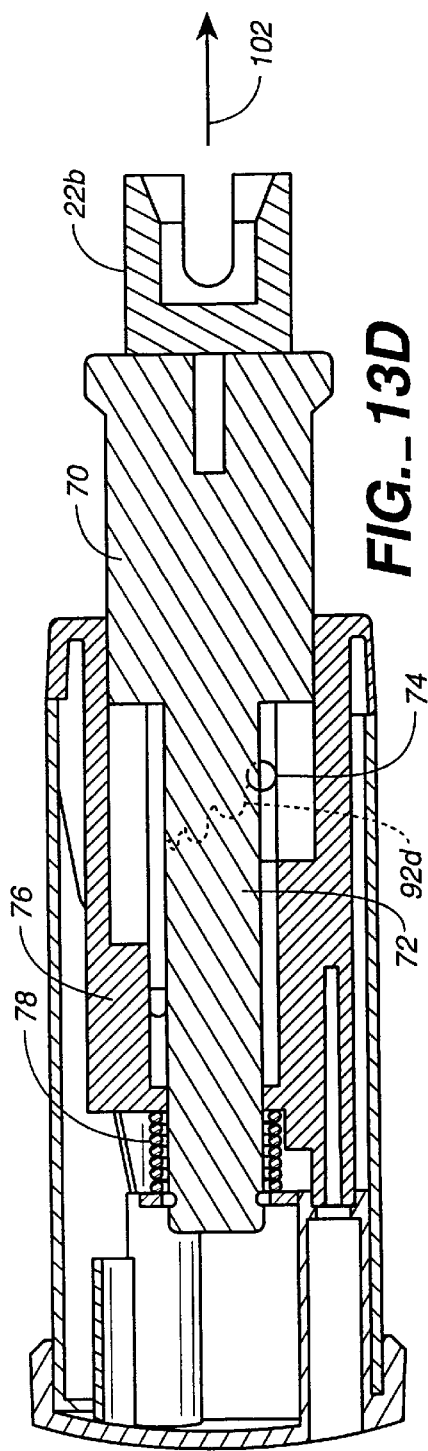

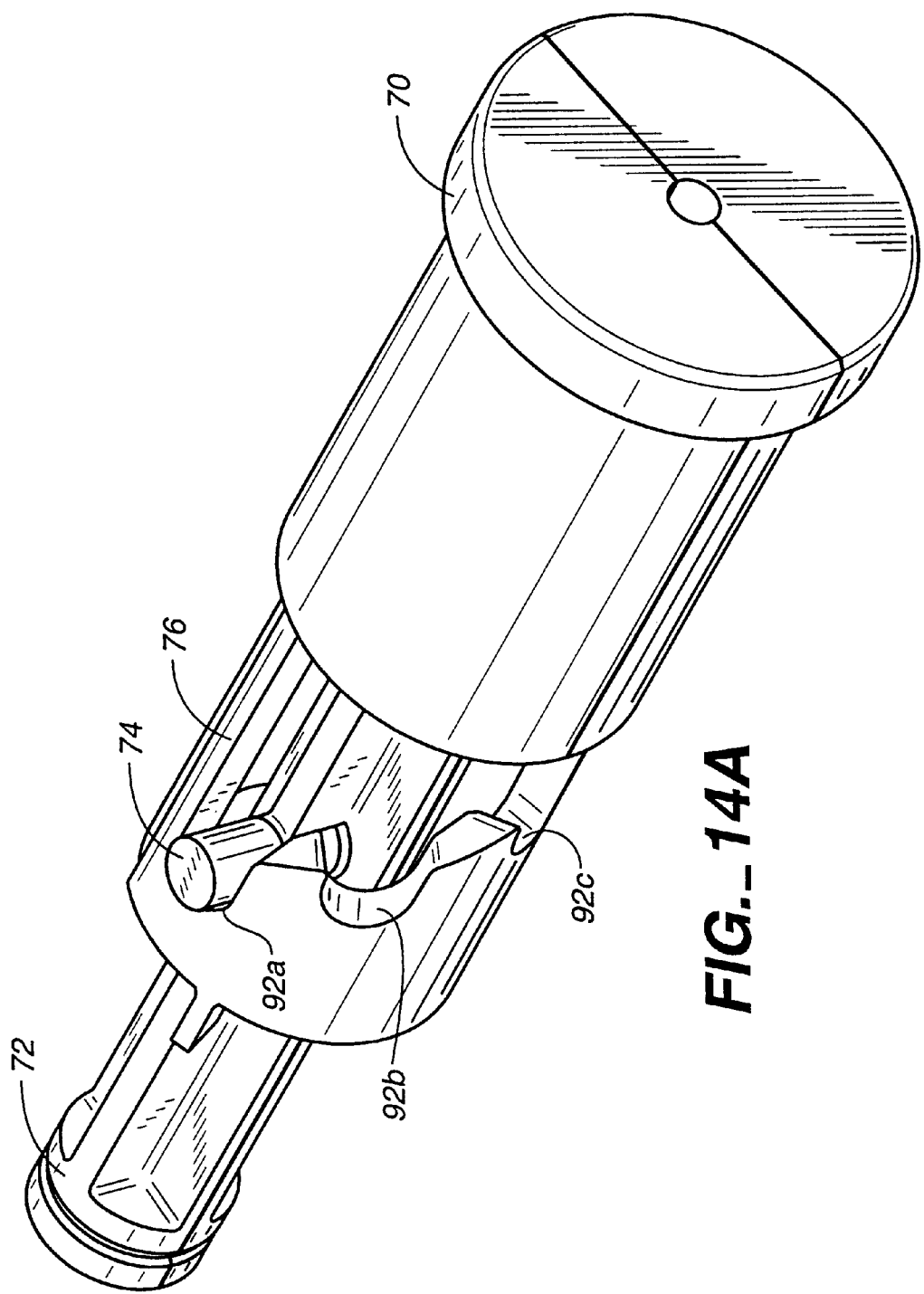
FIG._14A

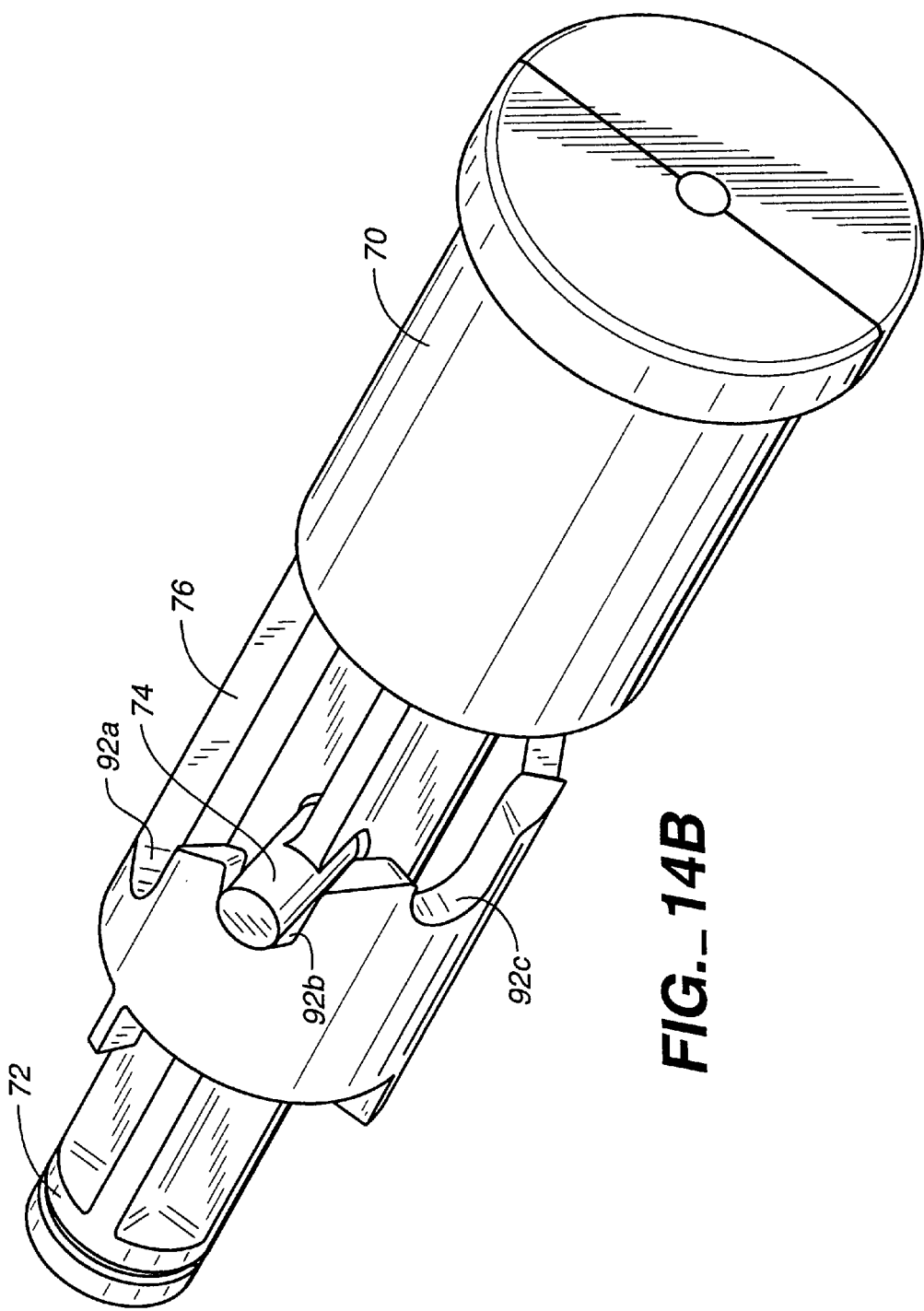
FIG._14B

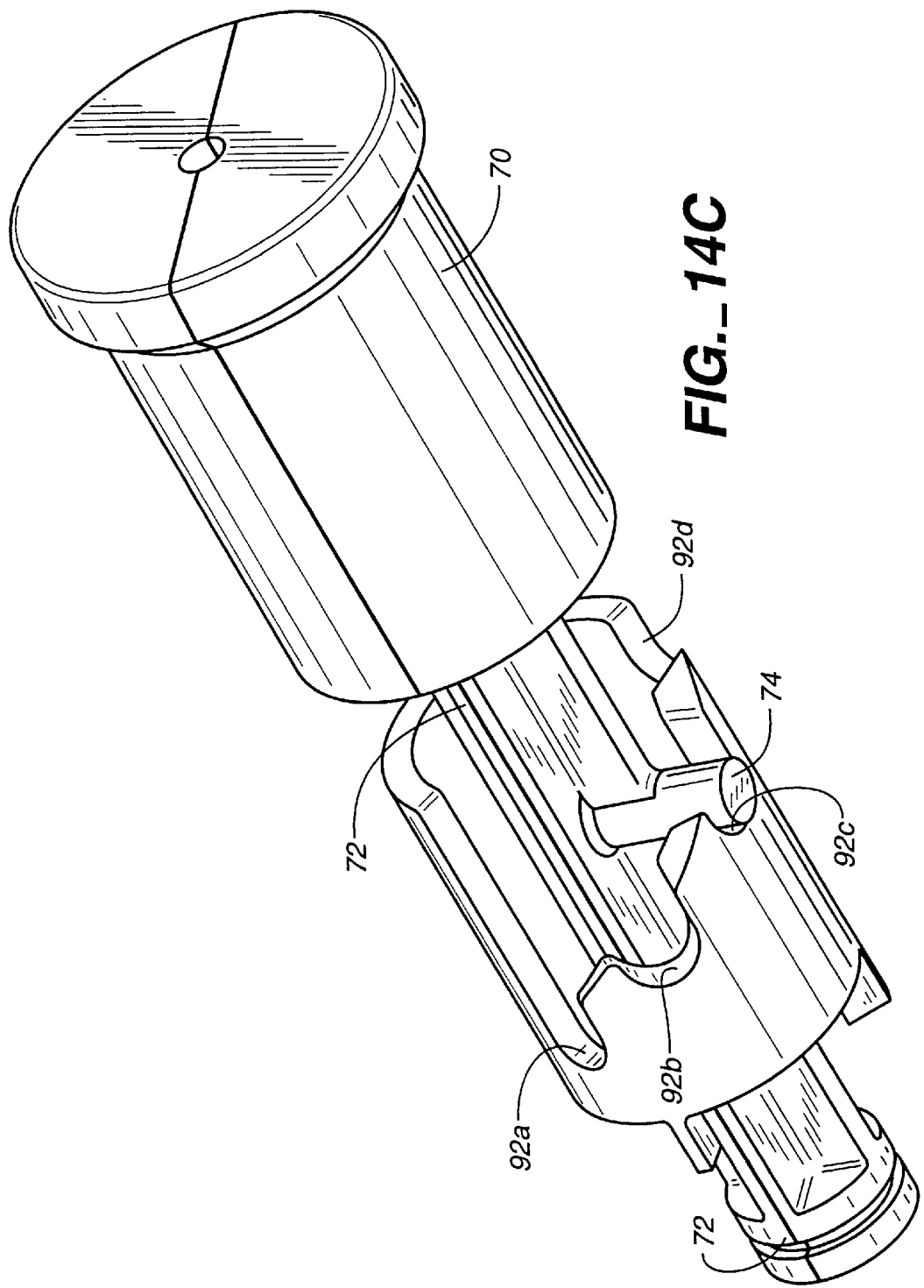
FIG._14C

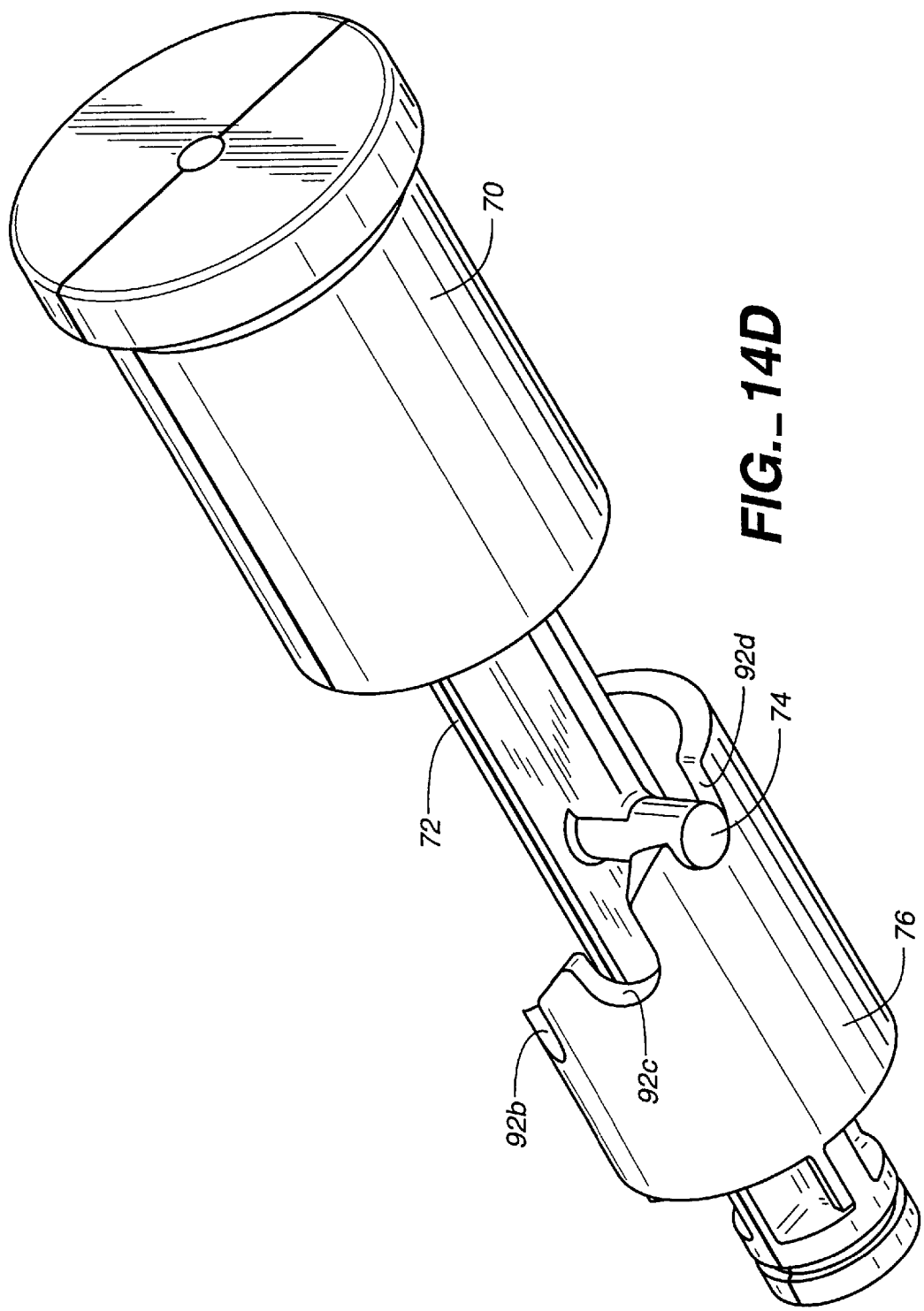
FIG._14D

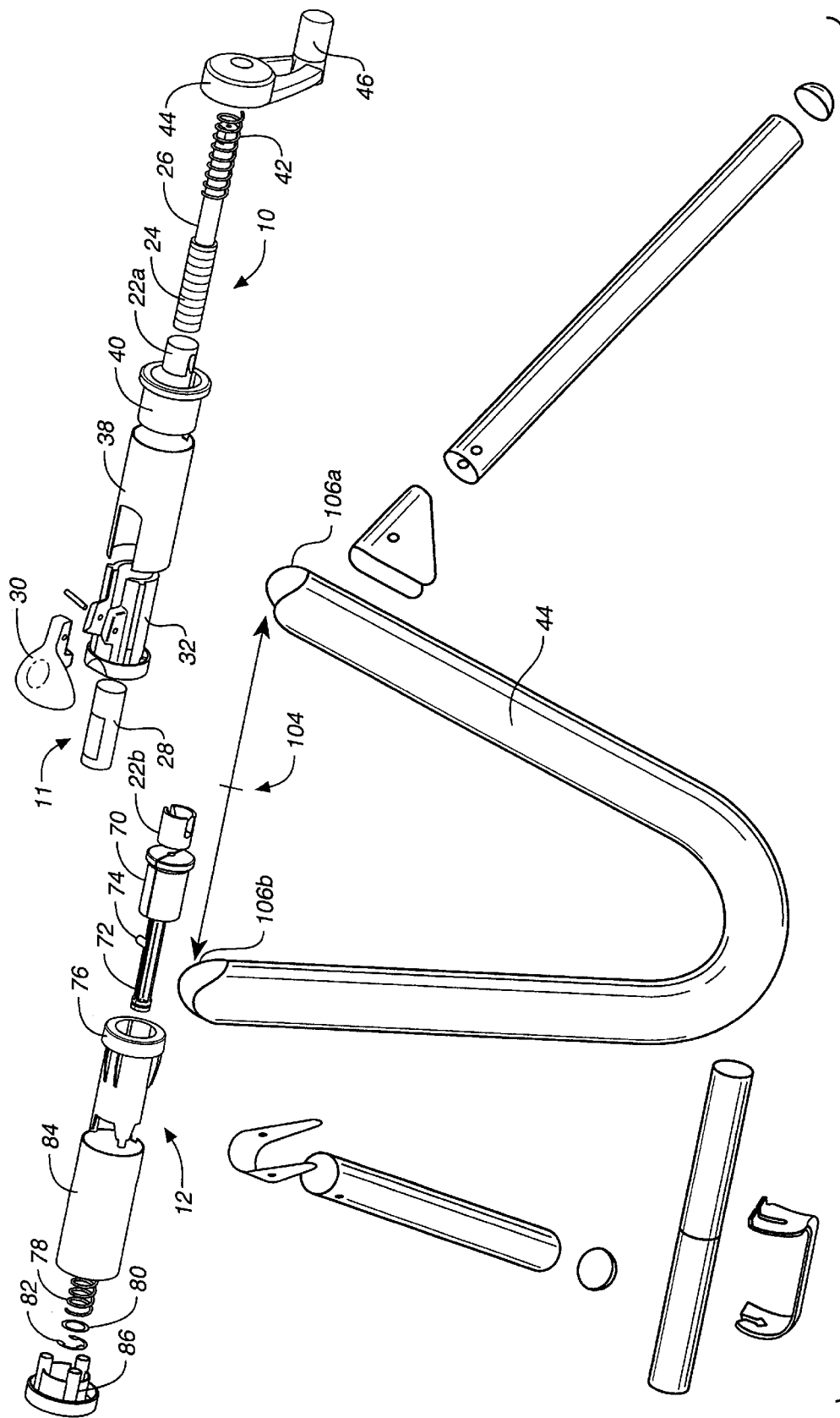
FIG._15A

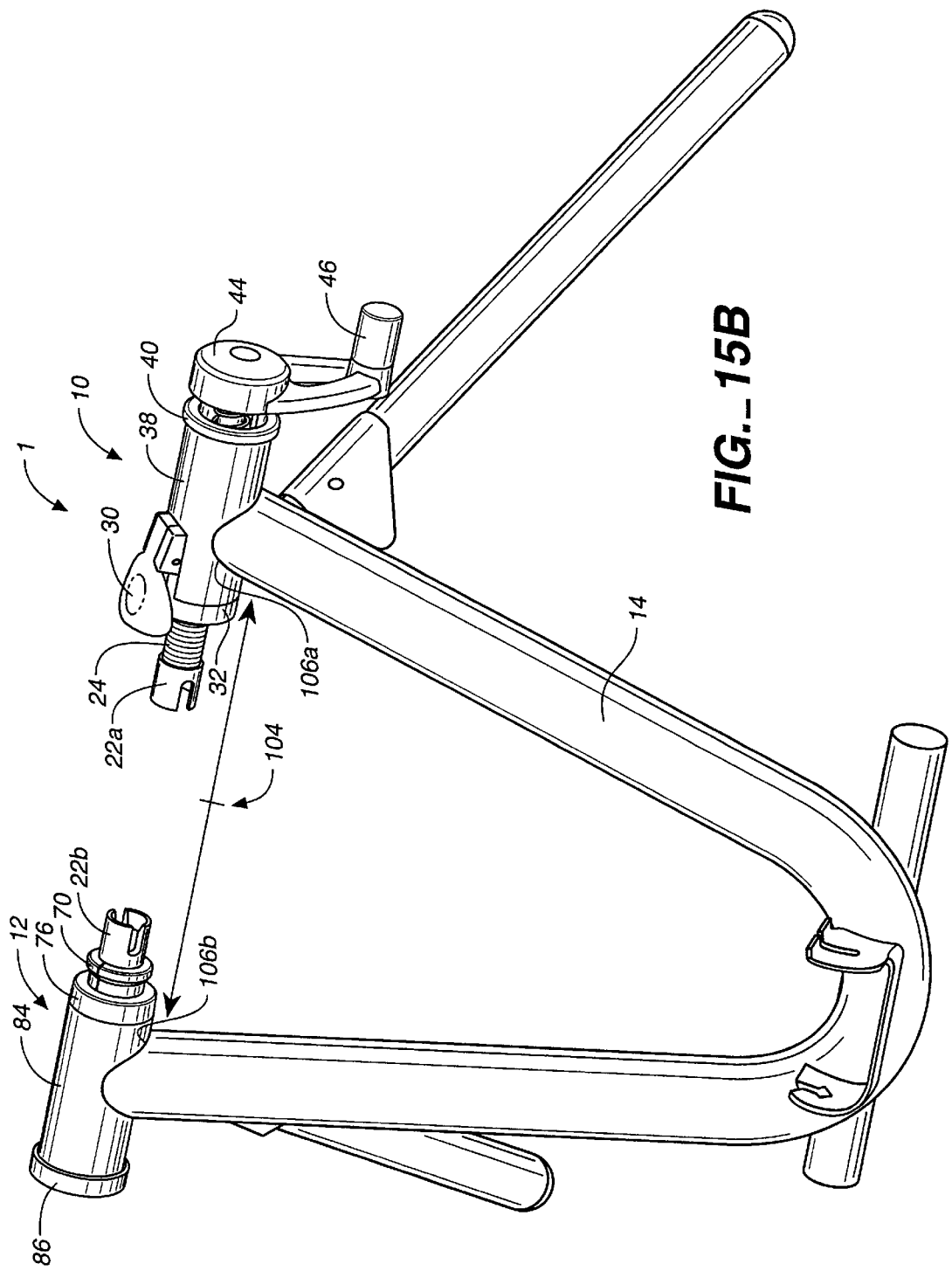

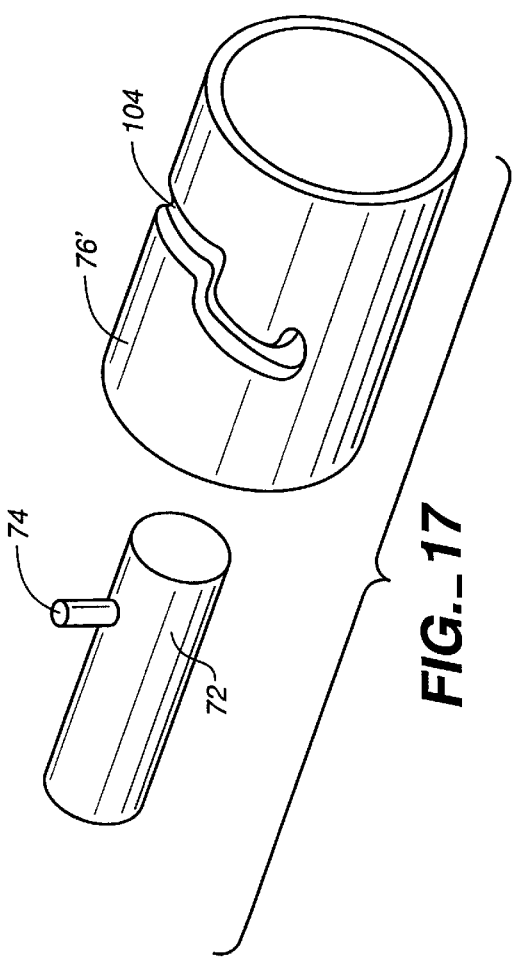
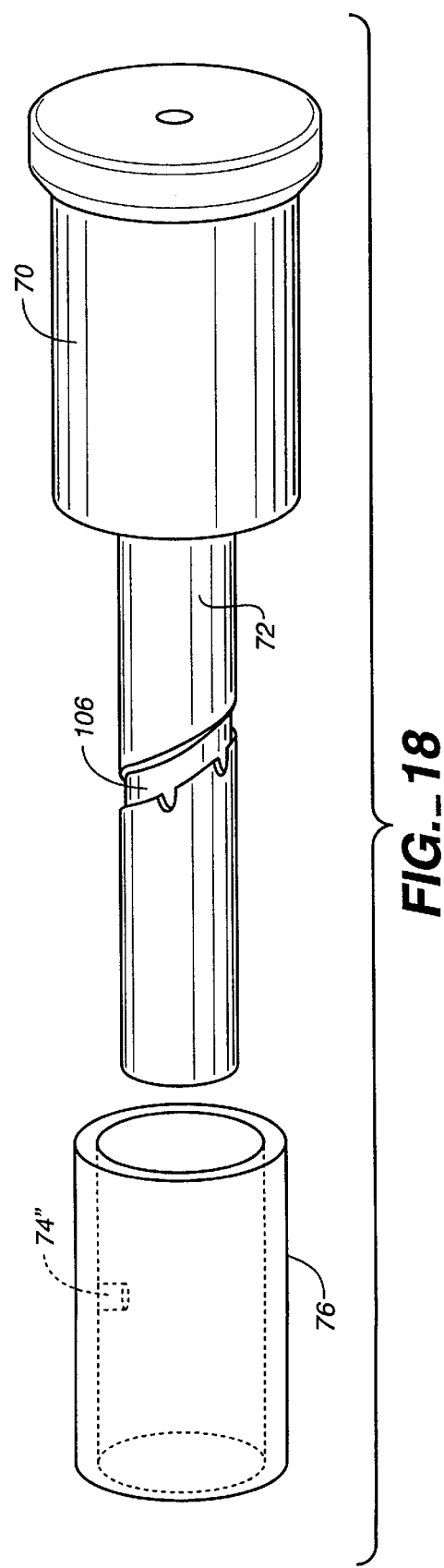
FIG._17
FIG._18

WHEEL ATTACHMENT

BACKGROUND

The present invention relates generally to a wheel attachment, and more particularly to attaching a wheel of a bicycle to a stationary trainer.

For many years, bicycle enthusiasts have used bicycle trainers to convert their bicycles for stationary (often indoors) riding. Rather than ride through inclement weather, the cyclist can use the trainer to ride indoors and obtain an aerobic, cardiovascular workout. Bicycle trainers also obviate the need for purchasing a separate stationary bicycle for those persons who want to occasionally workout while, for example, reading or watching television. A bicycle trainer should be easy to use and, to the extent possible, simulate bicycle riding on the open road.

Typical bicycle trainers attach a rear wheel of a bicycle to a resistance unit mounted in a frame. The resistance unit couples to the bicycle's rear tire, to provide a resistance force. The rear wheel is typically attached to the frame by fitting the ends of its axles (or its "skewers") into two opposing members (which are attached to two upward-extending frame arms and which can be shaped as open cylinders or cones). Typically, one member is relatively fixed while the other member is mounted on a shaft that can be adjusted inward.

To mount the bicycle in the trainer, the cyclist holds one skewer of the rear wheel in the relatively fixed member, while continuously rotating by screwing (or otherwise continuously translating, e.g., by a cam and follower) the adjustable shaft inward, until snug. The widths of various bicycle tire axles typically differ over a range of about 2 inches. Since one end of the bicycle wheel axle remains relatively fixed, a trainer of this type hence varies where the center of the bicycle tire lies with respect to the center of the frame members, when the other axle is secured in place.

SUMMARY

In general, in one aspect, the invention features an apparatus having: an axle attachment for removably holding an axle wherein the axle attachment is removably engageable with the end of the axle; a threaded shaft coupled to the axle attachment; and a latch that selectively engages the threads of the shaft.

Embodiments of the inventions may include the following features. The axle can be of a bicycle wheel. The latch can further include a nut portion, the nut portion selectably engages the threads of the shaft. The nut portion can include female threads which selectably engage the threads of the shaft. A housing can be placed around the shaft, coupled to the latch, and a portion of the latch can be moved towards and away from the housing. The axle attachment and shaft can be urged towards the axle, when the latch is disengaged from the shaft. A crank can be attached to the shaft to rotate the shaft around an axis of the shaft. The latch can further include a nut portion, the nut portion selectably engages the threads of the shaft such that the shaft moves relative to the latch along its axis when the crank is turned.

In general, in another aspect, the invention features an apparatus for removably holding an axle including an axle attachment, the axle attachment removably attachable to an end of the axle, a shaft coupled to the axle attachment, the shaft having at least one first position holder, and a housing around the shaft, the housing having at least one second position holder, the second position holder selectably mating with the first position holder.

Embodiments of the invention may include the following features. The axle can be of a bicycle wheel. The first position holder can be a pin, and the second position holder can be a ledge along an inside surface of the housing. Or, the first position holder can be a ledge along the outer surface of the shaft, and the second position holder can be a pin along an inside surface of the housing. A spring can couple the shaft and the housing, and the spring can releasably hold the first position holder against the second position holder. The shaft can have one first position holder and the housing can have at least two second position holders, or the shaft can have at least two first position holders and the housing can have one second position holder. The shaft can be moved relative to the housing such that the first position holder ceases mating with one of the second position holders in exchange for mating with another of the second position holders. The shaft can be moved relative to the housing such that the second position holder ceases mating with one of the first position holders in exchange for mating with another of the first position holders.

Advantages of the invention include the following. A cyclist can quickly and easily center a bicycle wheel within the frame of a bicycle trainer, and then quickly and easily tighten the bicycle axle within the trainer frame. The bicycle wheel can be relatively accurately centered within the frame to a selected degree of precision, by easily adjusting a shaft within a centering mechanism against a number of spaced position holders. The bicycle wheel can be grossly and then finely adjusted into a firm attachment. First, a shaft can be pushed within a rapid attach/release mechanism such that a releasable latch releases the shaft, pushing the shaft's end towards the wheel. A hand or even a leg can be used to push the shaft in this manner. Once the shaft is roughly in place, the latch can couple to threads on the shaft, allowing for fine adjustment and tightening by turning the shaft against the latch. The bicycle wheel is easily released by pulling the latch away from the shaft (after possibly loosening the shaft one or more turns). The invention allows a cyclist to train on a bicycle that is well-centered upon a stationary trainer, and allows the cyclist to easily attach and then release the bicycle wheel from the trainer. Centering of the bicycle within a trainer can be important for user balance and comfort, as well as for designing compact and sturdy resistance units that can function with many types of bicycles.

These and other features and advantages of the present invention will become more apparent from the following description, drawings, and claims.

DRAWINGS

FIG. 1 is a view of a bicycle trainer having centering and rapid attach/release mechanisms.

FIG. 2 is a rear view of the bicycle trainer with bicycle positioned for use by a rider.

FIG. 3 is an exploded view of a rapid attach/release mechanism for the bicycle trainer.

FIGS. 4a and 4b are top and cross-sectional views of the rapid attach/release mechanism.

FIG. 5 is a lower perspective view of a latch of the rapid attach/release mechanism.

FIGS. 6a and 6b are upper and cut-away perspective views of an assembled rapid attach/release mechanism.

FIGS. 7a through 7c are cross-sectional views displaying the operation of the rapid attach/release mechanism.

FIG. 8 is an exploded view of the centering mechanism.

FIGS. 9a and 9b are top and cross-sectional views of the centering mechanism.

FIGS. 10*a* and 10*b* are upper and cut-away perspective views of an assembled centering mechanism.

FIGS. 11*a* and 11*b* are perspective cut-away views of a centering bearing of the centering mechanism.

FIG. 12 shows the inside of the centering bearing, viewed along its axis.

FIGS. 13*a* through 13*d* are cross-sectional views displaying the operation of the centering mechanism.

FIGS. 14*a* through 14*d* are cut-away perspective views displaying the operation of the centering mechanism.

FIGS. 15*a* and 15*b* are exploded and assembled views of the rapid attach/release and centering mechanisms with bicycle trainer frame.

FIG. 16 is a perspective view of an alternative rapid attach/release arrangement.

FIG. 17 is a perspective view of an alternative rapid attach/release arrangement.

FIG. 18 is a perspective view of an alternative rapid attach/release arrangement.

DESCRIPTION

FIGS. 1 and 2 show a bicycle trainer 1 which includes a rapid attach/release mechanism 10 and a centering mechanism 12 coupled to a frame 14, and a resistance unit 16. Rear wheel 18 of bicycle 20, having an axle with protruding skewers 19*a* and 19*b*, attaches to centering mechanism 12 and rapid attach/release mechanism 10, and removably couples to resistance unit 16, for use by a rider to simulate outdoor rides. One example of a frame and resistance unit combination is shown in U.S. Pat. No. 5,611,759, incorporated herein by reference.

Referring to FIGS. 3, 4*a*, and 4*b*, the rapid attach/release mechanism 10 includes an axle engagement member in the form of a first notched member 22*a*, screw shaft 24 and crank shaft 26, screw housing sleeve 28, lever-actuated latch 30, screw housing 32, latch pin 34, latch holes 36*a* and 36*b*, screw tube 38, screw bearing 40, spring 42, crank 44, and crank handle 46. Screw shaft 24 and crank shaft 26 can be either distinct attached components, or fabricated as a unit.

First notched member 22*a*, screw shaft 24 and crank shaft 26, and crank 44 with crank handle 46 are attached together to form a member 48. Spring 42 presses against the inside surface of crank 44 to spring-load against screw bearing 40.

First notched member 22*a* removably couples to a skewer 19 of a bicycle, allowing the bicycle wheel to freely rotate about its axle axis. Screw shaft 24 has threads 25 along a portion of its length, which are exposed, when assembled, through screw window 29 of screw housing sleeve 28. Threads 25 can be "acme" type. Spring 42 can be placed fully within screw tube 38 and screw bearing 40, or within another housing, to secure spring 42 from the environment and a user's fingers.

Lever-actuated latch 30 attaches to screw housing 32 via latch pin 34 inserted through latch holes 36*a* and 36*b*. Referring also to FIG. 5, latch 30 includes hole 50 (through which latch pin 34 slides to hold latch 30 in place with latch holes 36*a* and 36*b*), and a nut region 52, which has partial threads 54 fabricated to mate with corresponding threads 25 on screw shaft 24. Nut region 52 descends through screw window 29 to removably couple to screw shaft 24. Latch 30 can also include a safety catch to secure latch 30 in its engaged position against screw shaft 24, thereby preventing unwanted slippage of the bicycle wheel from trainer 1. Latch 30 can be located on the upper portion of the rapid attach/release mechanism 10 to allow gravity to help keep it in its engaged position.

FIGS. 6*a* and 6*b* further show the assembled rapid attach/release mechanism 10 in perspective and cut-away views. FIGS. 7*a* through 7*c* show the operation of rapid attach/release mechanism 10, allowing easy attachment of a bicycle wheel 18 to frame 14. In its initial released state of FIG. 7*a*, first notched member 22*a* is completely retracted against screw housing 32, latch 30 is snugly resting upon screw shaft 24, and spring 42, pressing against screw bearing 40, forces crank 44 outward, away from screw housing 32 and screw bearing 40.

As shown in FIG. 7*b*, the user need only apply a sufficient force in direction 60 to push crank 44 towards screw housing 32 and screw bearing 40, compressing spring 42. This forces the surface of nut region 52 of latch 30 away from the threaded surface of screw shaft 24 so as to lift the end of latch 30 away from screw housing 32. This force also pushes first notched member 22*a* away from screw housing 32 and towards a skewer of the bicycle wheel 18. In this manner, a user can quickly achieve a gross positioning of first notched member 22*a* against the bicycle wheel skewer with a simple inward pressing motion that releases latch 30 and allows screw shaft 24 to quickly advance towards the skewer. The user can press against crank 44 either with a hand or with a leg (if the hands are occupied), making operation of rapid attach/release mechanism 10 convenient. Once force is released, latch 30 falls back into place. Then the friction of screw threads 54 on surface 52 of latch 30 against threads 25 of screw shaft 24 holds screw shaft 24 in its grossly-adjusted position.

Once first notched member 22*a* has been grossly adjusted in place against the skewer, more fine adjustment is possible. As shown in FIG. 7*c*, rapid attach/release mechanism 10 is finely adjusted to tighten against the skewer by turning crank handle 46 around axis 62 of screw and crank shafts 24 and 26. Latch 30 engages the threaded portion 25 of screw shaft 24, such that turning crank handles 46 finely adjusts the position of first notched member 22*a*, by turning threaded portions 25 of screw shaft 24 against threaded portions 54 of nut portion 52 of latch 30. The compressive force of spring 42 works in concert with mated threaded portions 25 and 54 to retain first notched member 22*a* in position.

The user can easily and quickly release first notched member 22*a*, thereby freeing an attached bicycle wheel, by lifting up on latch 30, possibly after loosening crank 44 one or more turns. Lifting latch 30 removes the connection between threads 54 and 25, thus allowing shaft 24 to move freely. This allows screw and crank shafts 24 and 26 to be pushed outward by compressed spring 42 to the position shown in FIG. 7*a*.

Referring to FIGS. 8, 9*a* and 9*b*, 10*a* and 10*b*, centering mechanism 12 includes second notched member 22*b*, centering shaft 70 attached to inner centering shaft 72 (having protruding centering pin 74), centering bearing 76, spring 78, washer 80, e-ring 82, centering housing 84, and centering end-cap 86 held in place with screws 88.

When assembled, spring 78 is loaded between washer 80 (held in place by e-ring 82 within notch 73 of inner centering shaft 72) and surface 90 of centering bearing 76. This forces centering assembly 96 (comprising second notched member 22*b*, centering shaft 70, and inner centering shaft 72) as far within centering bearing 76 as possible, in direction 94. Centering pin 74, forced against a first centering ledge 92*a* within centering bearing 76, retains assembly 96 against the force exerted by spring 78.

Referring to FIGS. 11*a*, 11*b*, and 12, a number of centering ledges 92*a* through 92*d* are located within, and along the longitudinal axis of, centering bearing 76. In one embodiment, four ledges 92 are used, each separated from the other by about 0.313 inches along axis 102 of centering bearing 76, and by about 60° around the axis. Any convenient choice of distances and angular displacements between successive centering ledges 92 can be chosen. Centering ledges 92a through 92d can be shaped as rounded depressions, into which centering pin 74 fits, and are separated by (along axis 102) sloped separation barriers 98a through 98c. Inner centering shaft 72 fits within shaft cavity 100, such that centering pin 74 will rest upon (or within) any one centering ledge 92 at a time.

Referring also to FIGS. 13a through 13d and 14a through 14d, a user can, by pulling second notched member 22b against the force of spring 78, and twisting assembly 96 around axis 102, pull centering pin 74 out of one such centering ledge 92 (along axis 102), over a respective separation barrier 98, and into another centering ledge 92. Since the new centering ledge is located a given distance either forward or backward along axis 102 from the prior centering ledge (all within centering bearing 76), this movement results in a forward or backward displacement of assembly 96 relative to centering bearing 76. Spring 78 retains centering pin 74 against its current centering ledge 92, until pulled and twisted again by the user.

Referring to FIGS. 15a and 15b, rapid attach/release mechanism 10 and centering mechanism 12 are assembled and then attached to a trainer frame 14. By pulling and twisting assembly 96 of centering mechanism 12, a user can adjust wheel attachment assembly 11 so that bicycle wheel 18 is located reasonably close to center 104 between end-portions 106a and 106b of frame 14. The spacing and number of centering ledges 92 provided in centering mechanism 12 can adjust the resolution for centering bicycle wheel 18 as required (the greater the number of ledges, and the smaller their relative spacing, the greater the centering resolution). Once the user has adjusted centering mechanism 12 for his or her bicycle wheel, rapid attach/release mechanism 10 can be gross adjusted by a quick force against crank 44, pushing first notched member 22a against its respective wheel skewer, and then can be fine adjusted by rotating crank handle 46, tightening first notched member 22a against the skewer. When an indoor training exercise (for example) has been completed, the user can quickly release the bicycle by pulling up on latch 30 (after possibly releasing pressure by unscrewing crank 44 one or more turns), thereby using the spring loaded rapid attach/release mechanism 10 to force first notched member 22a away from its respective skewer.

Other embodiments are within the scope of the claims. The apparatus and methods can be adapted to reasonably center, hold, and then rapidly release any type of wheel, for any purpose. With respect to the centering mechanism, pin 74 can be an elongated ribbed area, as in FIG. 16. An open channel 104, having centering ledges for the pin, can be fabricated completely through a centering bearing 76', as in FIG. 17. Having the pin extend through channel 104 also allows placing labels directly upon centering bearing 76' to relate each pin position (and thereby centering position) with categories of bicycles, to center corresponding wheel widths (e.g., "mountain", "racing", etc.). Further, ledges 106 (or similar channels) can be placed along (and within the surface of) centering shaft 72, such that a centering pin 74" can be attached to centering bearing 76 instead, essentially reversing their respective locations (as in FIG. 18). Any form or shape of ledge can be used. Various other spring arrangements and ledge directions can be used to retain the skewer-holding member at a particular location.

With respect to the rapid attach/release mechanism, other latch arrangements can be used, for example, a latch can completely encircle the circumference of the screw shaft, but selectably disengage the latch's inner threads from the threads of the screw shaft, to allow a quick gross adjustment of position. The latch can be arranged to disengage by pushing downward instead of lifting upward. Various other spring, latch, and thread arrangements and directions can be used to retain the skewer-holding member at a particular location.

What is claimed is:

1. Apparatus for removably holding an axle of a bicycle wheel comprising:
   an axle engagement member that is removably engageable with an end of the axle;
   a shaft coupled to the axle engagement member, the shaft having threads; and
   a latch that selectably engages the threads of the shaft to secure the axle engagement member in a fixed position in engagement with an end of the axle.

2. The apparatus of claim 1 wherein the latch includes a nut region, wherein the nut region selectably engages the threads of the shaft.

3. The apparatus of claim 2 wherein the nut region comprises threads which selectably engage the threads of the shaft.

4. The apparatus of claim 1 further comprising a housing placed around the shaft, wherein the housing is coupled to the latch.

5. The apparatus of claim 4 wherein the latch includes a lever which is movable toward and away from the housing.

6. The apparatus of claim 1 wherein the axle engagement member and shaft can be urged towards the axle, when the latch is disengaged from the shaft.

7. The apparatus of claim 1 further comprising a crank attached to the shaft, wherein the crank is adapted to be turned so as to rotate the shaft around an axis defined by the shaft.

8. The apparatus of claim 7 wherein the latch further comprises a nut region, wherein the nut region selectably engages the threads of the shaft such that the shaft moves relative to the latch along its axis when the crank is turned.

* * * * *